July 9, 1968  J. J. LOPINA  3,391,512
BUILDING STRUCTURE AND PANEL CONNECTION MEANS
Filed Oct. 23, 1965
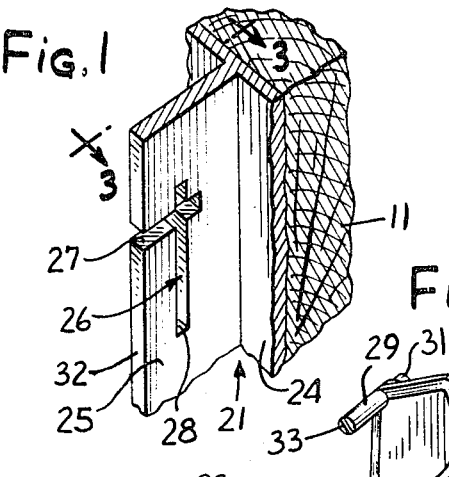
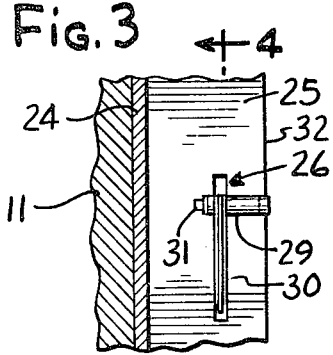
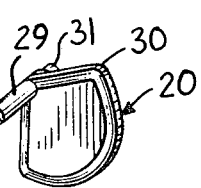
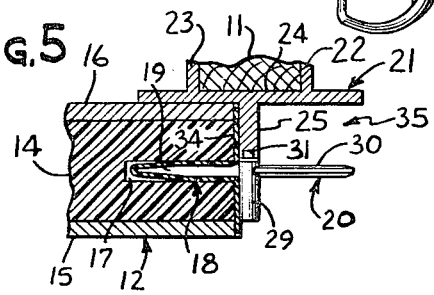
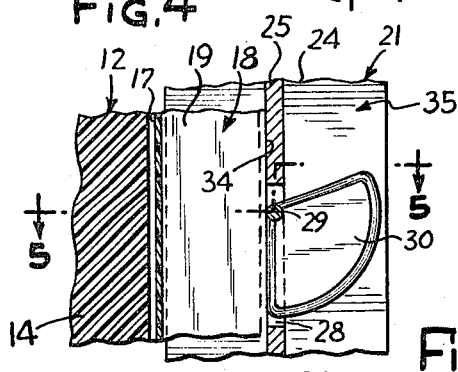
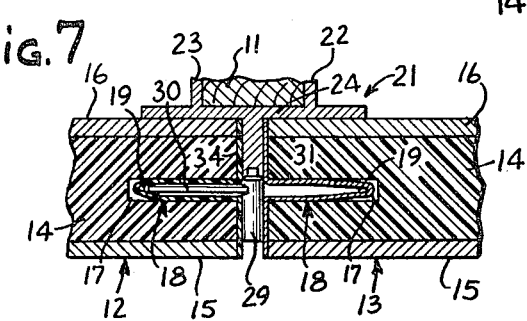
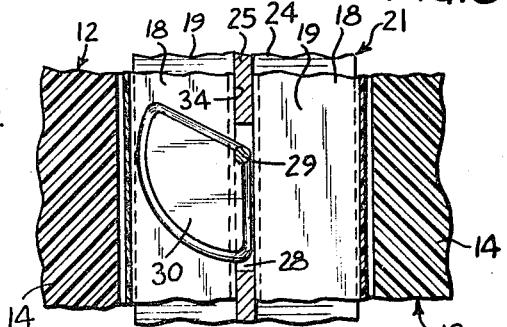
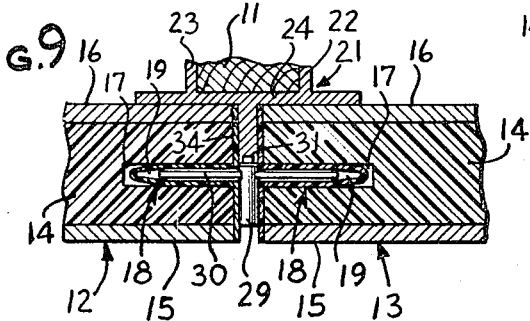
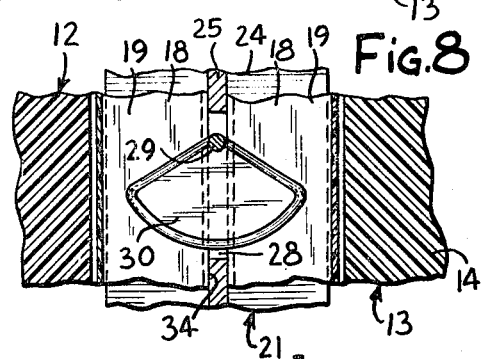
INVENTOR
JOSEPH J. LOPINA
Dressler, Goldsmith, Clement
Gordon & Ladd ATTYS.

United States Patent Office 3,391,512
Patented July 9, 1968

3,391,512
BUILDING STRUCTURE AND PANEL
CONNECTION MEANS
Joseph J. Lopina, Glenview, Ill., assignor to McDonald's System, Inc., a corporation of Illinois
Filed Oct. 23, 1965, Ser. No. 503,908
2 Claims. (Cl. 52—492)

The present invention relates to connector means and particularly to an interlocking mechanism in the form of a spline adapted for connection of adjacent structural moduli.

Splines as connection means for structural building components frequently might be indicated over other forms of connectors were it not for lack of expanse to permit endwise parts arrangement required preparatory to spline interlocking conditioning. In building constructions, for example, which comprise a plurality of adjoining panels for which splines would suitably and economically serve as connectors if they could be engaged in panel locking position, splines are not employed because there is no practical manner for spline introduction for interlocking adjacent panels, especially if they are adjacent a wall or ceiling which would block an expanse required for spline occupancy prior to disposition in panel locking engagement.

A principal object of the present invention is to provide an improved spline construction adapted for connection of building components and which obviates the requirement for expanse beyond the parts to be connected together.

It is additionally an object of the present invention to provide in a modular construction improved module connection means containable substantially within one module and movable into spanning or bridging position between a pair thereof.

A further object of the present invention is the provision of a spline for connection together of adjacent parts, the spline being adapted for substantially whole accommodation in a pocket or groove in a first of the parts to preclude obstruction of the space to be occupied by, and to permit positioning of, another part without interference by the spline, said spline being adapted for movement from the pocket or groove of the first part into a groove or pocket in the other part to bridge said parts and connect them together.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

In the drawings:

FIG. 1 is a perspective view of a portion of a runner mounted on a building part and providing a mount for a spline embodying the present invention;

FIG. 2 is a perspective view of said spline;

FIG. 3 is what may be considered a vertical sectional view of a portion of the runner showing its spline mounting flange in elevation, the view being taken substantially on the line 3—3 of FIG. 1 and looking in the direction of the arrows;

FIG. 4 is a vertical sectional view normal to the plane of FIG. 3, the view being taken substantially on the line 4—4 of FIG. 3 and looking in the direction of the arrows, however with one building panel being shown conditioned for securance adjacent the runner;

FIG. 5 is a composite transverse sectional view taken substantially on the line 5—5 of FIG. 4 and looking in the direction of the arrows;

FIG. 6 is a sectional view simiar to FIG. 4, however, showing an additional building panel conditioned for securance adjacent the runner;

FIG. 7 is a transverse sectional view similar to FIG. 5, however, conditioned with a pair of building panels as shown in FIG. 6;

FIG. 8 is a vertical sectional view similar to FIG. 6, however showing the spline conditioned for interlocking connection of the two building panels; and FIG. 9 is a composite transverse sectional view similar to FIG. 7 with the spline conditioned as in FIG. 8.

Referring now more particularly to the drawings, it is initially observed that the embodiment of the invention herein disclosed is for use in connection with a building construction and the like. It is intended however that the invention not be thusly limited inasmuch as it may be variously applied. Attention also is invited to the employment of directional designations such as "up," "down," "vertical" and "horizontal," and the like. Such designations are employed for convenience of description only and refer to orientation with respect to directions in the drawing; and except to the extent indicated, if any, such directional designations are not intended as being limiting upon the invention herein.

In FIGS. 1, 5, 7 and 9 there is seen what may be considered a building stud 11 which may be vertically disposed and fabricated from wood or a suitable composition or synthetic substance. The stud 11 may be one of a plurality of horizontally spaced apart like studs (not shown) which may be employed in a modular wall or partition construction. When the studs are so employed an array of substantially like rectangular moduli will comprise the wall construction. In the drawings said moduli are represented by a pair of coplanar panels 12 and 13 which may be of rectilinear form or outline and of like dimensions. While the panels illustrated are rectilinear and generally flat they may be curved, one may be flat and another right-angled, etc.

In the embodiment of the invention shown in the drawings, the width of the panels 12 and 13 will be substantially the same, though slightly less than, the distance between the centers of the studs to the end that each of said panels may be stud supported. Inasmuch as the instant invention may be illustrated by showing the adjoining parts of a pair of panels 12 and 13 and thereto adjacent structures including the single stud 11, the remainder of the building construction has been omitted from the drawings.

Having reference now to the panels 12 and 13, it is observed that they may be constructed in a manner taught in a copending application of the present applicant and filed Oct. 23, 1965, and bearing Ser. No. 503,374. Each panel here illustrated is characterized by a core 14, such as a foamed polyurethane, which is disposed between and secured to a pair of opposed cover members 15 and 16, such as the hardboard shown, metal or other somewhat rigid material. Each of the panels has an elongated outwardly opening pocket means such as vertically extending slot or groove 17 in which there may be positioned a groove lining member which in the embodiment shown is an elongated spring-like compression liner member 18. The liner member tapers to a generally V-shaped inner edge (in transverse section), and defines a receiving compartment 19 for releasable reception of a spline or connection member generally designated 20, the depth of the receiving compartment 19 being adequate to receive substantially all of the spline connection plate 30 which will be hereinafter described more fully.

An elongated vertically extending runner or panel mount, generally designated 21, cooperates with spline 20 for connection of panels 12 and 13 to the stud 11. The panel mount 21 herein disclosed comprises a pair of spaced apart vertical stud embracing flanges 22 and 23 which are integral with and extend normally from the inside of a flat 24 defining said panel mount to form an elongated stud receiving vertical wall or pocket extending longitudinally of said panel mount. An integral vertically extending spline mounting flange 25 projects outwardly from the outer face of the panel mount flat 24, said mounting flange 25 preferably being parallel to the runner flanges 22 and 23 are spaced midway therebetween to the end that like dimensioned moduli may be employed on both sides of the panel mount 21.

The mounting flange 25 has a cruciform slot 26, a preferred disposition and form of which is evident by reference to FIG. 1. The slot 26 is adapted to receive the spline 20 which is adapted for rocking arrangement in said slot. To that end the slot 26 has a horizontal part 27 and an intersection vertical part 28 which extends through opposite side faces of the spline mounting flange 25. The spline 20 has a pin-like or cylindrical component 29 which is adapted for disposition in slot part 27 and provides an axis about which said spline is rockable. As illustrated in FIGS. 5, 7 and 9, the cylindrical component 29 has an integral axial journaling extension 31 of reduced diameter which is seatable in a pocket therefor formed as an inner extension of slot part 27.

The spline includes the generally enlarged thin flat connection plate 30 which as illustrated is an arcuate segment and extends radially outward from a medial portion of the cylindrical part 29 to which the central end of the plate 30 is rigidly connected. While plate 30 is illustrated as generally flat with a tapered camming edge it may take a variety of forms depending upon a number of things such as the configuration of the receiving groove 17, among others. The connection plate 30 when conditioned for operation is rockable transversely of flange 25 through the slot part 28 as the cylindrical element 29 is rocked. As best seen in FIG. 3 the thickness of plate 30 is substantially the width of slot part 28 to the end that relative movement therebetween normal to plate 30 is minimized to rigidify the entire assembly. To rock the spline 20, the slot part 27 opens to the front edge 32 of the spline mounting flange 25, as illustrated in FIGS. 1 and 3. This provides access from the front of the panel mount 21 to the front end of the spline cylindrical part 29 which may be fashioned with a slot 33 for the reception of a motivating screw driver (not shown) or otherwise, as for example, angularly whereby the spline may be motivated with an Allen wrench, or the like. It is observed that the arcuate segment defining the connection plate 30 covers a projected area of less than 180 degrees. Thereby, upon rocking said spline, when it is mounted in operable position, the plate 30 can be conditioned in a manner such that it projects only to one side of the mounting flange 25. The significance of this feature will become apparent from the description of the operation of the device which next ensues.

To mount the pair of panels 12 and 13 in structure forming relationship, first one panel of a pair of coplanar panels, panel 12 is arranged with groove 17 of edge 34 closely adjacent one side of the flange 25, as is illustrated in FIGS. 4 and 5. The spline 20, which may therefore have been inserted in the cruciform slot, will be arranged to position spline plate 30 on the side of flange 25 opposite panel 12 so that no part extends into the space of the panel 12. Such arrangement will permit panel 12 to be inserted from in front of the panel mount 21 into a space such as one bounded on all sides and just sufficiently large to accommodate said panel 12, that is in a space in which a panel cannot be conveniently moved in at least one direction parallel to its plane and can be most conveniently moved only in a direction normal to its plane.

As illustrated, the panels 12 and 13 and the panel mount 21 are constructed in a manner such that when said panels are arranged in structure formation, their grooves 17 will be in operative alignment with the slot part 28. Therefore, upon rotation of spline 20 from the position shown in FIGS. 4 and 5 clockwise with respect to FIG. 4 (or transversely of side or edge 34) plate 30 will be received in groove 17 of panel 12.

Sufficient rotation of the spline 20 clockwise with respect to FIG. 4 to the position of FIGS. 6 and 7 will condition plate 30 with no part projected into the space 35 which will be occupied by the panel 13. In other words plate 30 will either lie entirely within groove 17 of panel 12 or within panel 13 and within the confines of spline mounting flange 25. Such spline conditioning permits insertion of the panel 13 from the front of the panel mount 21 into space 35 on a side of flange 25 opposite to the side thereof on which panel 12 is mounted. By reason of employment of the present invention, space 35 need be only large enough to accommodate said panel 13. Following insertion of panel 13, rotation of the spline counterclockwise just one half of the angular distance of its prior clockwise rotation, will condition said spline as in FIGS. 8 and 9, its plate 30 thereby being projected into groove 17 of panel 13, intersection the confronting edges or faces of panels 12 and 13 and bridging said panels 12 and 13 in a splined connection to resist relative movement of said panels in a direction normal to their plane and their confronting faces.

While the compression liners are proportioned to grippingly receive the inserted portions of plate 30 in receiving compartments 19 to rigidify the structure and make more positive the retention of the plate in bridging relationship, the shape and proportions of spline 20 are such that the tendency of spline 20 is to assume the position illustrated in FIG. 8 when the panels illustrated are vertically disposed. It will be appreciated that with other panel constructions, as well as with that shown, other means for making the spline difficultly rotatable may be used.

As many substitutions and changes can be made in the above described construction and as many apparently widely different embodiments of the invention within the scope of the claims can be constructed without departing from the scope and spirit thereof, it is intended that all matter contained in the specification shall be interpreted as being illustrative and not in a limiting sense.

I claim:

1. In a building construction having a plurality of adjoining moduli with coplanar major faces and confronting edge portions, a building stud having a segment interposed between said confronting edge portions, connector means supported on said segment between said moduli and comprising a generally flat spline portion and at an edge of said flat spline portion a normal axis portion about which said spline portion is rockable transversely of said confronting edge portions and parallel to the plane of said coplanar faces into and out of moduli bridging posture for releasably connecting said moduli together, said moduli having adjoining peripheral groove means disposed in a common plane for compressibly receiving and gripping said spline portion, the depth of each said groove means being adequate to accommodate said flat spline portion whereby it may be rockably removed from one of said groove means, said flat spline portion defining an arc greater than 90° whereby one of said moduli is locked to said segment as the other of said moduli is movable normal to its major faces into and out of its assembled relationship with the other of said moduli.

2. In the building construction of claim 1 in which said axis portion projects beyond both sides of said generally flat spline portion and said segment defines a cruciform slot, one leg of said slot rotatably supporting said axis portion and the other leg of said slot being coplanar with said moduli groove means and with said generally flat spline portion to permit said generally flat spline portion to rockably move therethrough.

(References on following page)

References Cited

UNITED STATES PATENTS

| | | | |
|---|---|---|---|
| 276,516 | 4/1883 | Whitney | 292—218 |
| 1,329,427 | 2/1920 | Otto | 292—202 |
| 1,494,512 | 5/1924 | Steiner | 292—202 |
| 1,593,944 | 7/1926 | Loetscher | 292—202 |
| 1,898,543 | 2/1933 | Johnson | 292—218 |
| 2,816,623 | 12/1957 | Wong | 52—496 |
| 3,280,522 | 10/1966 | Palfey | 52—285 |

FOREIGN PATENTS

| | | |
|---|---|---|
| 67,962 | 1948 | Denmark. |
| 74,429 | 1948 | Norway. |

HENRY C. SUTHERLAND, *Primary Examiner.*

FRANK ABBOTT, *Examiner.*

R. A. STENZEL, P. C. FAW, *Assistant Examiners.*